United States Patent
Fischer

(10) Patent No.: US 9,202,172 B2
(45) Date of Patent: Dec. 1, 2015

(54) APPARATUS FOR PROCESSING DATA IN A COMPUTER-AIDED LOGIC SYSTEM, AND APPROPRIATE METHOD

(75) Inventor: Jan-Gregor Fischer, Wifling/Woerth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 291 days.

(21) Appl. No.: 13/822,473

(22) PCT Filed: Aug. 17, 2011

(86) PCT No.: PCT/EP2011/064128
§ 371 (c)(1),
(2), (4) Date: Mar. 12, 2013

(87) PCT Pub. No.: WO2012/034805
PCT Pub. Date: Mar. 22, 2012

(65) Prior Publication Data
US 2013/0179391 A1     Jul. 11, 2013

(30) Foreign Application Priority Data
Sep. 13, 2010 (DE) .................. 10 2010 040 641

(51) Int. Cl.
G06N 5/04       (2006.01)
G06N 5/02       (2006.01)
G06F 17/30      (2006.01)

(52) U.S. Cl.
CPC .......... G06N 5/022 (2013.01); G06F 17/30734 (2013.01); G06N 5/045 (2013.01)

(58) Field of Classification Search
None
See application file for complete search history.

(56) References Cited

U.S. PATENT DOCUMENTS 7,376,632 B1    5/2008 Sadek et al.
8,751,420 B2 *  6/2014 Hjelm et al. .................... 706/12
(Continued)

FOREIGN PATENT DOCUMENTS

CN         1335959 A      2/2002

OTHER PUBLICATIONS

Fikes, Richard et al.; "JTP: A System Architecture and Component Library for Hybrid Reasoning"; 2003; Proceedings of the Seventh World Multiconference on Systemics, Cybernetics, and Informatics; 6 pages.*

(Continued)

*Primary Examiner* — Stanley K Hill
(74) *Attorney, Agent, or Firm* — Laurence Greenberg; Werner Stemer; Ralph Locher

(57) ABSTRACT

An apparatus for processing data in a computer-aided logic system includes at least one reasoning device having a reasoner, which draws conclusions on the basis of a semantic model and a model instance of the semantic model using data, at least one data source for providing data for processing by the reasoning device, and at least one application which makes a request to the reasoning device and receives results of conclusions from the reasoning device. The reasoning device and the data source interact such that the reasoning device takes an event which has occurred in the data source, particularly at particular times, as a basis for receiving associated event-based data from the data source for the purpose of drawing a causal and/or temporal-based conclusion. The information about the event-based data from the data source includes a temporal and a causal component. There are also described a related method and implementation.

19 Claims, 1 Drawing Sheet

(56) References Cited

U.S. PATENT DOCUMENTS

2006/0090165 A1\* 4/2006 Martin et al. ............. 719/318
2007/0124263 A1 5/2007 Katariya et al.

OTHER PUBLICATIONS

Tonnis, Marcus et al.; "From Sensors to Assisted Driving—Bridging the Gap"; 2008; Academy Publisher; Journal of Software, vol., 3, No. 3; pp. 71-82.\*

Fuchs: "Semantische Modellierung und Reasoning für Kontextinformationen in Infrastrukturnetzen", Dissertation an der Fakultät für Mathematik, Informatik und Statistik des Ludwig Maximilans-Universität-München, Sep. 16, 2008, Internet: URL:http://edoc.ub.uni-muenchen.de/9348/1/Fuchs_Florian.pdf; Book; Muenchen, Germany.

Cristina De Ambrosi et al: "An Ontology-Based Condition Analyzer for Fault Classification on Railway Vehicles", Jun. 24, 2009, Next-Generation applied Intelligence, Springer Berlin Heidelberg, Berlin, pp. 449-458; Book.

Sirin et al: "Pellet: A practical OWL-DL reasoner", WEB Semantics: Science, Services and Agents on the World Wide Web: www.elsevier.com/locate/websem; Elsevier, Bd. 5, Nr. 2, Jun. 5, 2007, pp. 51-53; Book.

Fuchs, F. et al.: A Decentralized and Ontology-Based Approach to Infrastructure Monitoring. Journal: Siemens AG, Corporate Technology, Tech. Rep, 2008, CiteSeerX [online]. DOI=10.1.1.143.6460, Munich, Germany; In: CiteSeerX; Others.

Zafeiropoulos, A. et al.: "A Semantic-based Architecture for Sensor Data Fusion". The Second International Conference on Mobile Ubiquitous Computing, Systems, Services and Technologies, 2008. UBICOMM'08, 2008, S. 116-121, IEEE Xplore [online]. 001: http://dx.doi.org/10.1109/UBICOMM.2008.67, In: IEEE;Athens, Greece; Others.

Wang, Z. et al.: "Forgetting Concepts in DL-Lite", The Semantic Web: Research and Applications, 2008, pp. 245-257. Springerlink [online]. DOI: http://dx.doi.org/10.1007/978-3-540-68234-9_20, ; Berlin, Germany; In: Springer; Others.

\* cited by examiner

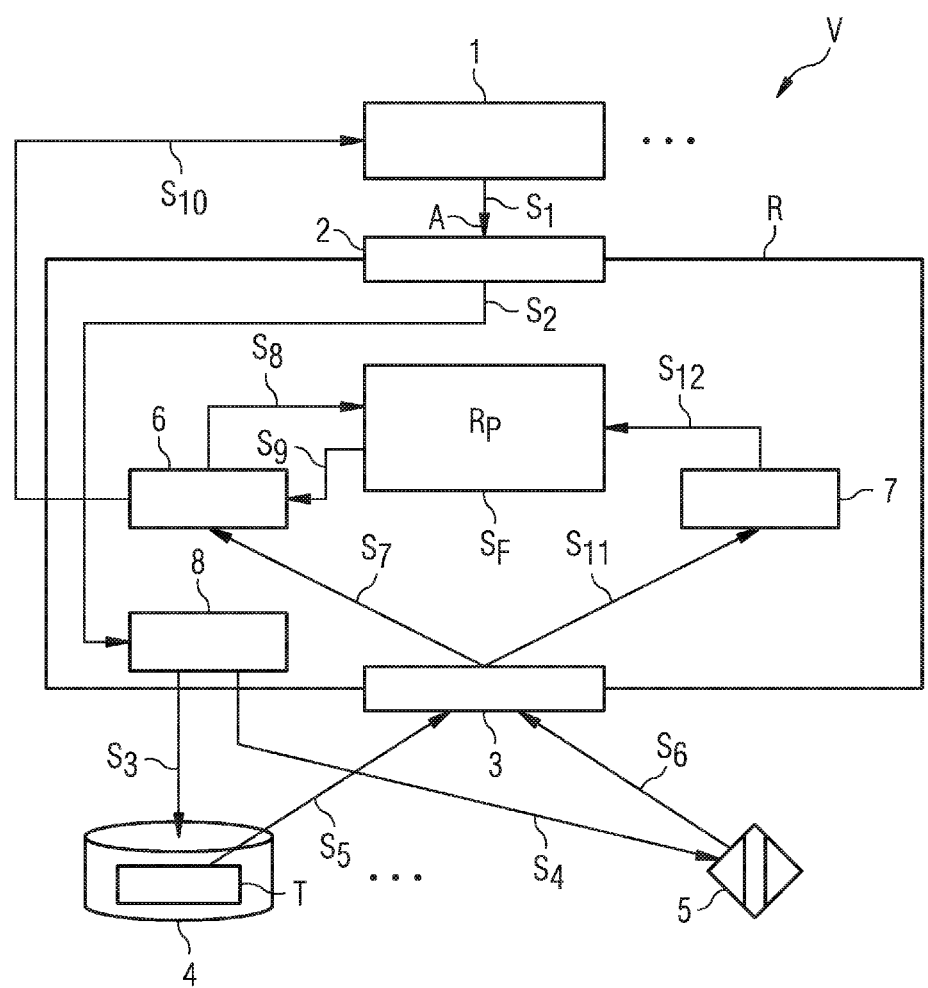

APPARATUS FOR PROCESSING DATA IN A COMPUTER-AIDED LOGIC SYSTEM, AND APPROPRIATE METHOD

BACKGROUND OF THE INVENTION

Field of the Invention

The invention relates to an apparatus for processing data in a computer-aided logic system, and an appropriate method, an appropriate application and an appropriate computer program product.

The invention is in the field of computer science and relates to computer-based logic systems in which computer-aided knowledge can be derived in accordance with a description logic based on a semantic model (also termed an ontology) and appropriate model instances of the model. This knowledge derivation corresponds to the derivation of inferences in the description logic. The term description logic is a technical term in the field of computer science and describes a family of languages for knowledge representation, with the majority of description logics being a fragment of first-order predicate logic. However, in contrast to predicate logic, description logics are decidable, which facilitates the generation of new knowledge by way of inferencing.

The ontology or the semantic model which is employed according to the invention is formally defined in description logic and is also termed by the person skilled in the art as TBox (TBox=Terminological Box). The TBox contains the terminological knowledge about the concepts of a domain. In contrast to this, the model instance of the TBox (also termed the ABox=Assertional Box), represents logical statements about individuals by means of the appropriate terminological terms of the ontology. In an industrial scenario, terminological terms of a Tbox are systems and plants, for example, which are monitored by sensors which make monitoring data available directly or indirectly via a database. In the industrial scenario, the corresponding ABoxes which represent specific instances, contain specific sensors, that is to say distance sensors, gas sensors, temperature sensors, etc., for example.

In order to derive inferences in a description logic, so-called reasoners are usually utilized, which are systems which use the logical reasoning methods on explicitly stated knowledge in the form of the above-mentioned TBoxes or ABoxes. Depending on the expressiveness of the underlying description logic, the corresponding reasoning method of a reasoner is created with varying degrees of complexity, which in turn results in a varying reasoner resource requirement in the form of runtime and memory requirement. This resource requirement is in turn dependent on the amount of knowledge to be processed in the form of the Tboxes and ABoxes. If the knowledge to be processed increases, the resource requirement of the description logic reasoner also increases.

Where logic systems are used in distributed industrial scenarios, a very large amount of knowledge frequently has to be considered simultaneously and processed in an integrated form. This knowledge is usually integrated in a single ABox. If this amount of data in the ABox is too large, known description logic reasoners can no longer appropriately use the reasoning methods integrated in them, since the description logic reasoners operate efficiently only on local, existing knowledge and retain their internal data structures exclusively in the main memory of an appropriate computer. The use of conventional description logic reasoners for distributed logic systems in which data in the form of ABoxes occurs in large quantities and at many different points, is therefore not possible.

This also applies in particular to so-called pull-based solutions in which applications make active requests to the reasoners, which affect inferences by means of the TBox and the ABox. These are not powerful enough to process large amounts of data caused by active data requests at a high frequency. A rapid reaction to the application is only possible to a limited extent, if for example, the application is intended to detect a critical event in real time and initiate countermeasures.

To solve this problem, a method which uses a plurality of reasoners has been known from DE 10 2007 029 122 A1. For this the ABox is distributed among different reasoners. If a request from the application is made to one of the reasoners, those reasoners which are necessary for the processing of the request are determined first of all. The request from the application is then subdivided into sub-queries and processed separately from the previously determined reasoners. The individual reasoners then feed back the results of the respective sub-queries, which are then assembled into an overall result and fed back to the application. A disadvantage of this, however, is that a plurality of reasoners has to be used. In addition, time-critical requests and the determination of appropriate inferences by the reasoner or reasoners are only possible to a limited extent since the division of the original request into sub-queries and the assembly of the results of the sub-queries requires additional time. Moreover, because of different sub-queries, different reasoners need more time for the derivation of an inference, so that in this case the overall result in the form of the inference is only available for the application when all reasoners have returned a result of the sub-queries.

BRIEF SUMMARY OF THE INVENTION

A problem of the present invention is therefore to make available an apparatus and a method which facilitate time-critical requests and inferences, are simple and economical to produce or implement, and at the same time require limited memory requirement for inferences.

This problem is solved by an apparatus for processing data in a computer-aided logic system, comprising at least one reasoning device having a reasoner which generates inferences on the basis of a semantic model and a model instance of the semantic model using data, at least one data source for providing data for processing by the reasoning device, and at least one application which makes a request to the reasoning device and receives results of inferences from the reasoning device, with the reasoning device and the data source interacting in such a way that the reasoning device takes an event which has occurred in the data source, in particular at specific times, as a basis for receiving information about the event and event-based data from the data source for the purpose of drawing a causal and/or temporal-based inference and with the information about the event and/or the event-based data of the data source comprising a temporal and a causal component.

The problem is likewise solved by a method for processing data in a computer-aided logic system, including the steps:
  sending a request from an application to at least one reasoning device,
  transmitting information about event-based data from a data source to the reasoning device, with the transmission of the data from the data source to the reasoning device being event-based, in particular taking place at specific times,
  determining a causal and/or a temporal-based inference by a reasoner of the reasoning device on the basis of a semantic model and a model instance of the semantic model by way of the data from the data source of the transmitted information and transmitting the inference to the application by means of the reasoning device.

The advantage achieved by this is that, essentially, the memory requirement and the computing time of the reasoner that is required for processing requests remains the same. Furthermore, there is virtually a free choice of semantic model (TBox) with regard to its complexity, with the time-critical requests no longer having to be processed punctually. Moreover, the apparatus allows the processing of temporal logic correlations of different events. In order to avoid losing important temporal dependencies due to the limited memory requirement of the apparatus, the apparatus or the method facilitates the aggregation of events to higher-order inferences. So, for example, different sensor values which in each case in a time slot $t_n$, $t_{n+1}$, produce at any one time an inference of a temperature rise, are combined in an inference of a temperature rise between the times $t_i$, $t_{n+1}$, where $0<=i=n+1$.

Further features and advantages of the invention are described in the subclaims.

Advantageously, the reasoning device includes removal means for removing obsolete data and/or inferences from a memory of the reasoning device. The advantage obtained in this case is that even with events which occur at high frequency, the resource requirement, in particular the memory requirement, is not increased or is essentially maintained constant. The means for the removal of obsolete data removes this only if an aggregation of information about inferences takes place at a higher level.

Usefully, the reasoning device includes event control means for processing events, with the event control means being embodied so as to transmit inferences from the reasoner to the application. Consequently, the advantage here is that events or their data can be simply and reliably fed from the data source to the reasoner and events from the reasoner can be transmitted directly to the inquiring application. As a result, time-intensive, additional processing steps, such as transmission of the events from the reasoner via a central interface, for example, can be dispensed with.

Advantageously, the reasoning device includes subscription means which are embodied in order to appropriately select a data source by way of the application request. Consequently, the advantage here is that a request from the application requires a minimum data volume and the application can equally send a request to the reasoning device on an abstract level, since in the case of a plurality of different data sources, the application does not need to know the exact selection and/or availability of the data sources. The subscription means analyze the request and then, for the determination of an inference, select one or more data sources appropriate to the request.

Usefully, trigger means are arranged between a data source and the reasoning device. The advantage of the trigger means is that as a result, data sources, for example databases, can be connected, which cannot transmit any events that occur, such as a change in an analog sensor value, for example, and the corresponding data, to the reasoning device. Independently of the reasoning components, the trigger means then periodically make a request to the data source for new and/or modified data and, where there is new or modified data, transmit the new or modified data to the reasoning device for further processing.

Advantageously, the causal and the temporal components of the event-based data of the data source are logically combined. As a result, the advantage obtained here is that inferences of causal correlations can be made more simply by means of temporal relations by the reasoning device, which enhances the flexibility of the apparatus.

Usefully, the magnitude of a model instance depends on the size of a time slot. In this way, the volume of model instance data of the reasoning components is essentially determined by the size of the time slot, which at a specific time is relevant to the reasoning device; overall, the volume of the model instance data therefore remains essentially constant. This allows the apparatus to be realized in the form of an integrated circuit which usually has a limited memory.

Advantageously, a first and a second reasoning device is provided, with the first reasoning device being embodied as a data source for the second reasoning device. Consequently, the advantage obtained here is that on the one hand it is possible to process application requests in parallel, so that overall the time for processing one request is reduced. On the other hand, it is also possible to reduce the complexity by step-by-step preprocessing. Consequently, the volume of data for one request to be transmitted between two reasoning devices is therefore reduced.

Advantageously, obsolete data and/or obsolete inferences are removed from the reasoning device and/or the data source. This reduces the number of events to be held in the reasoning device and/or the data source, and the memory requirement of the reasoning device is minimized.

Usefully, the reasoning device selects a data source by way of the request from the application. Consequently, the advantage obtained here is that requests from the application can be formulated at the reasoning device in an abstract and concise manner, since the application does not have to name individual data sources in the request, rather the selection of the data sources needed for an inference for the request is carried out by the reasoning device.

The reasoning device may tag the data from the data source with date stamps and/or with temporal dependencies.

BRIEF DESCRIPTION OF THE SEVERAL VIEWS OF THE DRAWING

Further features and advantages of the invention are revealed in the following description of an exemplary embodiment.

Here FIG. 1 shows a schematic diagram of an apparatus according to one embodiment of the present invention.

In FIG. 1, the reference character V denotes an apparatus for processing data in a computer-aided logic system. The apparatus includes an application 1, a reasoning device R and data sources in the form of a database 4 and an analog sensor 5. In step $S_1$ the application 1 sends a subscribing request A to the reasoning device R via a subscription interface 2. This request A can be defined in SPARQL for example and can state that the application 1 shall be informed about all critical faults in the overall system or, for example, critical analog sensor values.

DESCRIPTION OF THE INVENTION

Data that is required in a Pellet reasoner $R_p$ of the reasoning device for creating inferences can in the first case exist in a diagnostic database 4 of an overall system, and in the second case can originate in an analog sensor 5 located on a component of the overall system. Files, log files, Internet services, etc., can be used as separate or combinable data sources 4, 5.

In a further step $S_2$, the subscribing request A is transmitted from the subscription interface 2 to subscription means 8 of the reasoning device R. Depending on the type of request A from the application 1, the subscription means 8 now select one or a plurality of data sources 4, 5 by analyzing the request A coming from the application 1 according to its semantics and then forward an appropriate subscription to the respective data source 4, 5 by way of the analysis carried out in step $S_3$ or $S_4$. At the same time, the reasoning device R creates by means of the subscription means 8 an allocation in the form of a table between the respective data sources 4, 5 and the request A from the application 1.

The case where a database 4 is selected by the subscription means 8 is described in the following. Here the selection of the analog sensor 5 and the corresponding steps are executed in analog fashion. A trigger T, in this case in the form of a database trigger, is connected upstream of the database 4. The trigger T checks at short intervals whether the new data has been added to the database or existing data has been modified. If new data arrives, for example by the addition of a new dataset to the database 4, and this is detected by the trigger T, for example by automatic activation of the trigger T, the trigger T sends the corresponding modified data from the database 4, for example as an event, using Realtime Streaming Protocol Publish, etc., for example in the form of Resource Description Framework or Web Ontology Language instance data, to a forwarding interface 3 of the reasoning device R in step $S_5$. In step $S_7$ the event and the associated data are then transmitted from the forwarding interface 3 to the event control means 6. The event control means 6 transmit the information consisting of event and associated data to the Pellet reasoner $R_p$ in step $S_8$ or, if necessary, by previous transformation into OWL instance data. A Fact++– or a RacerPro reasoner can of course also be used instead of the Pellet reasoner $R_p$.

The Pellet reasoner $R_p$ now makes inferences based on the information transmitted to it, for example in which it detects a critical fault. In step $S_9$, the inferences are transmitted by the Pellet reasoner $R_p$ to the event control means 6. With the aid of the tables previously created by the subscriptions means 8, the event control means 6 analyze the respective application and in a further step $S_{10}$ transmit the inferences of the Pellet reasoner $R_p$ to the application 1. In a further step $S_{11}$, removal means 7 are notified that new data, that is to say the affected inferences, is present. The removal means 7 analyze an ABox of the Pellet reasoner $R_p$ and in step $S_{12}$ remove the data from the ABox, which is no longer required and which was enlisted for the inferences.

Although the present invention was described above by way of a preferred exemplary embodiment, it is not restricted to this but can also be modified in a variety of ways.

For example, it is therefore also possible to use data sources in the form of Excel files, Word files, Access databases, Web services or general structured data of any form as a data source. Furthermore, depending on the resource requirement of the reasoner or the reasoning device, it is also possible to use different description logic languages such as OWL Light, OWL DL, OWL Full, OWL2 EL, OWL2 QL, OWL2 RL, etc., according to the required expressiveness and resource requirement of the application.

LIST OF REFERENCE SYMBOLS

V Apparatus
1 Application
$S_1$ Subscription
2 Subscription interface
3 Forwarding interface
R Reasoning device
$R_p$ Pellet reasoner
T Trigger
4 Database
5 Sensor
6 Event means
7 Removal means
8 Subscription means
$S_1$-$S_{12}$ Process steps

The invention claimed is:

1. An apparatus for processing data in a computer-aided logic system, comprising:
at least one reasoning device having a reasoner configured to make inferences based on a semantic model and a model instance of the semantic model using data;
at least one data source connected to said at least one reasoning device for providing data for processing by said reasoning device;
at least one application configured to make a request to said reasoning device and to receive results of inferences from said reasoning device;
said reasoning device and said data source interacting in such a way that said reasoning device receives associated event-based data from said data source for making a causal and/or temporal inference at a time triggered by a determination that an event has occurred in said data source, and wherein information about the event-based data from said at least one data source includes a temporal component and a causal component.

2. The apparatus according to claim 1, wherein the event that has occurred in said data source is a defined point in time.

3. The apparatus according to claim 1, wherein said reasoning device includes a memory and removal means for removing items selected from the group consisting of obsolete data and inferences from said memory of said reasoning device.

4. The apparatus according to claim 1, wherein said reasoning device includes event control means for processing events, and wherein said event control means are configured to transmit inferences from said reasoner to said application.

5. The apparatus according to claim 1, wherein said reasoning device includes subscription means configured for appropriately selecting a respective said data source by way of a request from said application.

6. The apparatus according to claim 1, which comprises a trigger device connected between a respective said data source and said reasoning device, said trigger device configured to perform the determination that the event has occurred in said data source and to trigger a transfer of the event-based data from said data source to said reasoner upon making the determination.

7. The apparatus according to claim 1, wherein the causal and the temporal components of the event-based data of said data source are logically combined.

8. The apparatus according to claim 1, wherein the model instance of the semantic model has a magnitude that depends on a size of a time slot.

9. The apparatus according to claim 1, wherein said at least one reasoning device is one of at least a first and a second reasoning device, and wherein said first reasoning device is configured as said data source for said second reasoning device.

10. A method of processing data in a computer-aided logic system, the method which comprises:
sending a subscribing request from an application to at least one reasoning device;

transmitting information about event-based data from a data source to the reasoning device at a time triggered by a determination that an event has occurred in the data source;

determining at least one inference selected from the group consisting of a causal and a temporal-based inference by a reasoner of the reasoning device on the basis of a semantic model and a model instance of the semantic model by way of the data of the data source of the transmitted information and transmitting the inference from the reasoning device to the application.

11. The apparatus according to claim 1 configured for implementing the method for processing data in a computer-aided logic system according to claim 10.

12. The method according to claim 10, wherein the transmission of the data from the data source to the reasoning device takes place at specific times.

13. The method according to claim 10, which further comprises removing at least one item selected from the group consisting of obsolete data and obsolete inferences from at least one device selected from the group consisting of the reasoning device and the data source.

14. The method according to claim 10, which comprises providing data from the data source with at least one information item selected from the group consisting of date stamps and temporal dependencies.

15. The method according to claim 14, which comprises tagging the data from the data source with at least one information item selected from the group consisting of date stamps and temporal dependencies with the reasoning device.

16. The method according to claim 10, wherein the reasoning device selects a data source by way of the request from the application.

17. The method according to claim 10, which comprises providing the apparatus according to claim 1 and processing therewith the data in the computer-aided logic system.

18. The method according to claim 10, which comprises:
  connecting a trigger device between the data source and the reasoning device; and
  with the trigger device, performing the determination that the event has occurred in the data source and triggering a transfer of the event-based data from the data source to the reasoner upon making the determination.

19. A computer program product, comprising a program code stored in non-transitory form on a machine-readable data medium and configured for implementing the method according to claim 10, when the program runs on a computer.

\* \* \* \* \*